United States Patent
Jang et al.

(10) Patent No.: US 10,399,449 B2
(45) Date of Patent: Sep. 3, 2019

(54) WIRELESS CHARGING CONTROL APPARATUS AND METHOD FOR OPTIMAL CHARGING BY ADJUSTING THE INCLINATION OF THE ELECTRIC VEHICLE BEING CHARGED

(71) Applicants: Hyundai Motor Company, Seoul (KR); Kia Motors Corporation, Seoul (KR)

(72) Inventors: Jin Su Jang, Hwaseong-si (KR); Taek Hyun Jung, Hwaseong-si (KR); Zeung Il Kim, Hwaseong-si (KR); Jae Yong Seong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 98 days.

(21) Appl. No.: 15/658,064

(22) Filed: Jul. 24, 2017

(65) Prior Publication Data

US 2018/0037126 A1 Feb. 8, 2018

(30) Foreign Application Priority Data

Aug. 8, 2016 (KR) .................. 10-2016-0100867
Jun. 27, 2017 (KR) .................. 10-2017-0081346

(51) Int. Cl.
*B60L 11/18* (2006.01)
*H02J 50/90* (2016.01)
(Continued)

(52) U.S. Cl.
CPC .......... *B60L 11/1831* (2013.01); *B60L 53/12* (2019.02); *B60L 53/39* (2019.02); *H02J 7/0021* (2013.01);
(Continued)

(58) Field of Classification Search
CPC ... B60L 11/1831; B60L 11/182; H02J 7/0027; H02J 7/0021; H02J 7/025; H02J 50/90; H02J 50/12
(Continued)

(56) References Cited

U.S. PATENT DOCUMENTS 5,165,715 A * 11/1992 Sakamoto .......... B60G 17/0162
280/5.502
5,703,461 A * 12/1997 Minoshima .......... B60L 11/182
320/108
(Continued)

FOREIGN PATENT DOCUMENTS

| JP | 5199495 B1 * | 5/2013 | ............ H01M 10/46 |
| KR | 101535038 B1 * | 7/2015 | .......... B60L 11/1831 |
| WO | WO-2013145581 A1 * | 10/2013 | ............ H01M 10/46 |

OTHER PUBLICATIONS

"Accelerometer, Gyro, and IMU Buying Guide," Sparkfun, Accessed Online Dec. 21, 2018, published on google Jul. 17, 2010, https://www.sparkfun.com/pages/accel_gyro_guide.*

*Primary Examiner* — Robert Grant
*Assistant Examiner* — John T Trischler
(74) *Attorney, Agent, or Firm* — Morgan, Lewis & Bockius LLP (57) ABSTRACT

A wireless charging control apparatus may include at least one horizontal detector configured for detecting an inclination of an electric vehicle (EV); a suspension control device controlling a plurality of suspensions disposed near wheels of the EV to adjust a height or inclination of the EV; and a controller measuring the inclination of the EV based on data collected from the at least one horizontal sensor, estimating an inclination of a reception pad based on the measured inclination of the EV, and controlling the suspension control device to adjust the inclination of the EV when the inclina- (Continued)

tion of the reception pad is equal to or greater than a predetermined threshold value.

14 Claims, 5 Drawing Sheets

(51) Int. Cl.
  *H02J 50/12* (2016.01)
  *H02J 7/00* (2006.01)
  *H02J 7/02* (2016.01)
  *B60L 53/12* (2019.01)
  *B60L 53/39* (2019.01)

(52) U.S. Cl.
  CPC ............ *H02J 7/0027* (2013.01); *H02J 7/025* (2013.01); *H02J 50/12* (2016.02); *H02J 50/90* (2016.02); *B60L 2240/10* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
  USPC .......................................................... 320/108
  See application file for complete search history.

(56) References Cited

U.S. PATENT DOCUMENTS

| | | | | |
|---|---|---|---|---|
| 5,821,731 A * | 10/1998 | Kuki | ............ | B60L 11/1805 320/108 |
| 5,850,135 A * | 12/1998 | Kuki | ............ | B60L 11/1805 320/108 |
| 6,150,794 A * | 11/2000 | Yamada | ............ | B60L 11/007 320/108 |
| 6,684,794 B2 * | 2/2004 | Fiske | ............ | B60L 13/04 104/281 |
| 7,017,701 B2 * | 3/2006 | Flynn | ............ | B60G 17/017 180/282 |
| 7,208,912 B2 * | 4/2007 | Ghabra | ............ | H02J 50/12 320/108 |
| 7,211,986 B1 * | 5/2007 | Flowerdew | ............ | H02J 7/025 320/108 |
| 7,660,654 B2 * | 2/2010 | Lu | ............ | B60T 8/17554 280/5.506 |
| 8,005,596 B2 * | 8/2011 | Lu | ............ | B60T 8/17554 280/5.507 |
| 8,013,571 B2 * | 9/2011 | Agassi | ............ | B60K 1/04 320/109 |
| 8,148,924 B2 * | 4/2012 | Ohkuwa | ............ | H02J 1/14 307/10.1 |
| 8,164,300 B2 * | 4/2012 | Agassi | ............ | B60K 1/04 320/104 |
| 8,219,282 B2 * | 7/2012 | Lu | ............ | B60T 8/17554 280/5.506 |
| 8,346,433 B2 * | 1/2013 | Lu | ............ | B60T 8/17554 280/5.506 |
| 8,373,310 B2 * | 2/2013 | Baarman | ............ | H01F 38/14 307/104 |
| 8,466,660 B2 * | 6/2013 | Iizuka | ............ | B60L 11/182 320/137 |
| 8,552,592 B2 * | 10/2013 | Schatz | ............ | H01Q 7/00 307/104 |
| 8,723,366 B2 * | 5/2014 | Fiorello | ............ | H01F 38/14 307/104 |
| 8,731,781 B2 * | 5/2014 | Prentice | ............ | B62D 35/02 701/49 |
| 8,754,608 B2 * | 6/2014 | Yoon | ............ | H02J 7/025 320/108 |
| 8,772,960 B2 * | 7/2014 | Yoshida | ............ | H02J 50/12 307/9.1 |
| 8,803,484 B2 * | 8/2014 | Iizuka | ............ | B60L 11/182 320/137 |
| 8,874,291 B2 * | 10/2014 | Gresser | ............ | B60G 17/0157 701/22 |
| 8,890,369 B2 * | 11/2014 | Baarman | ............ | H01F 38/14 307/104 |
| 9,077,191 B2 * | 7/2015 | Peiker | ............ | H02J 7/0044 |
| 9,080,988 B2 * | 7/2015 | Okada | ............ | G01N 21/94 |
| 9,184,633 B2 * | 11/2015 | Obayashi | ............ | B60L 11/123 |
| 9,246,035 B2 * | 1/2016 | Eaton, Jr. | ............ | H01L 31/042 |
| 9,365,126 B2 * | 6/2016 | Widmer | ............ | B60L 11/182 |
| 9,463,705 B2 * | 10/2016 | Grabar | ............ | H02J 50/90 |
| 9,469,207 B2 * | 10/2016 | Keeling | ............ | B60L 5/005 |
| 9,525,288 B2 * | 12/2016 | McKernan | ............ | B60L 11/182 |
| 9,555,716 B2 * | 1/2017 | Martin | ............ | B60L 11/182 |
| 9,627,919 B2 * | 4/2017 | Radziemski | ............ | H02J 7/0042 |
| 9,659,223 B2 * | 5/2017 | Itou | ............ | B60L 11/1829 |
| 9,673,664 B2 * | 6/2017 | Nakamura | ............ | H02J 5/005 |
| 9,701,211 B2 * | 7/2017 | Iizuka | ............ | B60L 11/182 |
| 9,738,169 B2 * | 8/2017 | Kim | ............ | B60L 11/1829 |
| 9,764,606 B2 * | 9/2017 | Makin | ............ | B60C 23/0469 |
| 9,802,501 B2 * | 10/2017 | Krammer | ............ | B62D 15/025 |
| 9,855,852 B2 * | 1/2018 | Cho | ............ | B60L 11/182 |
| 10,023,059 B2 * | 7/2018 | Roehrl | ............ | B60L 11/182 |
| 10,040,362 B2 * | 8/2018 | Kim | ............ | B60L 11/1831 |
| 10,046,660 B2 * | 8/2018 | Pavlovsky | ............ | B60L 11/1811 |
| 10,086,715 B2 * | 10/2018 | Lewis | ............ | B60L 11/1829 |
| 10,090,885 B2 * | 10/2018 | Widmer | ............ | H04B 5/0037 |
| 10,227,017 B2 * | 3/2019 | Bae | ............ | G05D 1/0246 |
| 2003/0217668 A1 * | 11/2003 | Fiske | ............ | B60L 13/04 104/282 |
| 2004/0094913 A1 * | 5/2004 | Flynn | ............ | B60G 17/017 280/6.153 |
| 2006/0071632 A1 * | 4/2006 | Ghabra | ............ | H02J 50/12 320/108 |
| 2006/0129291 A1 * | 6/2006 | Lu | ............ | B60T 8/17554 701/36 |
| 2007/0112485 A1 * | 5/2007 | Rogers | ............ | G01B 21/26 701/31.4 |
| 2008/0100258 A1 * | 5/2008 | Ward | ............ | H01M 10/465 320/101 |
| 2008/0143292 A1 * | 6/2008 | Ward | ............ | B60L 8/003 320/101 |
| 2010/0094510 A1 * | 4/2010 | Lu | ............ | B60T 8/17554 701/45 |
| 2010/0106358 A1 * | 4/2010 | Lu | ............ | B60T 8/17554 701/31.4 |
| 2010/0141206 A1 * | 6/2010 | Agassi | ............ | B60K 1/04 320/109 |
| 2010/0201203 A1 * | 8/2010 | Schatz | ............ | H01Q 7/00 307/104 |
| 2010/0201312 A1 * | 8/2010 | Kirby | ............ | H02J 7/025 320/108 |
| 2010/0231340 A1 * | 9/2010 | Fiorello | ............ | H01F 38/14 336/92 |
| 2010/0277121 A1 * | 11/2010 | Hall | ............ | B60L 11/182 320/108 |
| 2011/0006611 A1 * | 1/2011 | Baarman | ............ | H01F 38/14 307/104 |
| 2011/0044791 A1 * | 2/2011 | Agassi | ............ | B60K 1/04 414/806 |
| 2011/0109262 A1 * | 5/2011 | Iizuka | ............ | B60L 11/182 320/108 |
| 2011/0303509 A1 * | 12/2011 | Agassi | ............ | B60K 1/04 198/604 |
| 2012/0091949 A1 * | 4/2012 | Campanella | ............ | H01F 38/14 320/108 |
| 2012/0200151 A1 * | 8/2012 | Obayashi | ............ | B60L 11/123 307/9.1 |
| 2012/0200254 A1 * | 8/2012 | Yoon | ............ | H02J 7/025 320/108 |
| 2012/0239250 A1 * | 9/2012 | Lu | ............ | B60T 8/17554 701/36 |
| 2012/0262002 A1 * | 10/2012 | Widmer | ............ | H02J 5/005 307/104 |
| 2012/0299373 A1 * | 11/2012 | Yoshida | ............ | H02J 50/12 307/9.1 |

(56) References Cited

U.S. PATENT DOCUMENTS

| | | | |
|---|---|---|---|
| 2012/0303193 A1* | 11/2012 | Gresser | B60G 17/0157 701/22 |
| 2013/0029686 A1* | 1/2013 | Moshfeghi | G01S 19/48 455/456.1 |
| 2013/0113423 A1* | 5/2013 | Baarman | H01F 38/14 320/108 |
| 2013/0147429 A1* | 6/2013 | Kirby | H02J 7/025 320/108 |
| 2013/0175987 A1* | 7/2013 | Amma | B60L 11/182 320/108 |
| 2013/0241476 A1* | 9/2013 | Okada | G01N 21/94 320/108 |
| 2013/0249470 A1* | 9/2013 | Martin | B60L 11/182 320/107 |
| 2013/0265004 A1* | 10/2013 | Iizuka | B60L 11/182 320/108 |
| 2013/0285595 A1* | 10/2013 | Eaton, Jr. | H01L 31/042 320/101 |
| 2014/0015493 A1* | 1/2014 | Wirz | H02J 7/025 320/137 |
| 2014/0285030 A1* | 9/2014 | Nakamura | H02J 5/005 307/104 |
| 2014/0285138 A1* | 9/2014 | Duschl-Graw | B60L 5/005 320/108 |
| 2014/0312707 A1* | 10/2014 | Fiorello | H01F 38/14 307/104 |
| 2014/0327301 A1* | 11/2014 | Iizuka | B60L 11/182 307/9.1 |
| 2014/0333252 A1* | 11/2014 | Raponi | H02J 7/025 320/108 |
| 2014/0333256 A1* | 11/2014 | Widmer | B60L 11/182 320/108 |
| 2014/0354041 A1* | 12/2014 | Yoshi | H02J 7/025 307/9.1 |
| 2015/0042269 A1* | 2/2015 | Koren | H02J 7/025 320/108 |
| 2015/0280484 A1* | 10/2015 | Radziemski | H02J 7/0042 320/108 |
| 2015/0286880 A1* | 10/2015 | Itou | B60L 11/1829 348/148 |
| 2015/0298560 A1* | 10/2015 | Keeling | B60L 5/005 191/10 |
| 2015/0352963 A1* | 12/2015 | Grabar | H02J 50/90 320/108 |
| 2016/0009187 A1* | 1/2016 | Niizuma | H02J 5/00 307/9.1 |
| 2016/0046197 A1* | 2/2016 | Kim | B60L 11/1829 320/137 |
| 2016/0046198 A1* | 2/2016 | Krammer | B62D 15/025 701/22 |
| 2016/0059723 A1* | 3/2016 | Kim | B60L 11/1831 320/108 |
| 2016/0082848 A1* | 3/2016 | Ichikawa | B60L 11/123 701/22 |
| 2016/0089987 A1* | 3/2016 | Ichikawa | B60L 11/182 701/22 |
| 2016/0254677 A1* | 9/2016 | McKernan | B60L 11/182 307/9.1 |
| 2016/0257222 A1* | 9/2016 | Nakagawa | B60L 15/2063 |
| 2016/0318413 A1* | 11/2016 | Roehrl | B60L 11/182 |
| 2016/0368387 A1* | 12/2016 | Pavlovsky | B60L 11/1811 |
| 2016/0375785 A1* | 12/2016 | Liu | B60L 1/003 701/22 |
| 2017/0057365 A1* | 3/2017 | Cho | B60L 11/1827 |
| 2017/0129342 A1* | 5/2017 | Tajima | B60L 5/39 |
| 2017/0151883 A1* | 6/2017 | Bae | B60L 53/37 |
| 2017/0182852 A1* | 6/2017 | Makin | B60C 23/0469 |
| 2017/0182903 A1* | 6/2017 | Kwasnick | B60L 11/182 |
| 2017/0282732 A1* | 10/2017 | Lewis | B60L 11/1829 |
| 2017/0313201 A1* | 11/2017 | Amari | H02J 50/90 |
| 2017/0313202 A1* | 11/2017 | Amari | B60L 11/1829 |
| 2017/0313203 A1* | 11/2017 | Amari | B60L 11/1835 |
| 2017/0361723 A1* | 12/2017 | Elshaer | B60L 11/1829 |
| 2017/0361724 A1* | 12/2017 | Seong | H02J 50/90 |
| 2017/0361725 A1* | 12/2017 | Seong | H02J 50/90 |
| 2017/0363581 A1* | 12/2017 | Makin | G01N 29/04 |
| 2018/0015836 A1* | 1/2018 | Madon | B60L 11/1827 |
| 2018/0099569 A1* | 4/2018 | Iwamoto | H02J 50/12 |
| 2018/0178666 A1* | 6/2018 | Javaid | B60L 11/1831 |
| 2018/0186242 A1* | 7/2018 | Rhodes | B25J 5/00 |
| 2018/0190426 A1* | 7/2018 | Wirth | B60L 11/182 |
| 2018/0194236 A1* | 7/2018 | Elshaer | B60L 11/182 |
| 2018/0201370 A1* | 7/2018 | Yang | B64C 39/024 |
| 2018/0204675 A1* | 7/2018 | Wirth | B60L 11/182 |
| 2018/0212434 A1* | 7/2018 | McKernan | H02J 5/005 |
| 2018/0241258 A1* | 8/2018 | Seong | B60L 11/1829 |
| 2018/0287416 A1* | 10/2018 | Saita | H02J 7/025 |
| 2018/0339598 A1* | 11/2018 | Iwamoto | B60L 11/1829 |
| 2019/0016218 A1* | 1/2019 | Haag | B60L 11/1818 |

* cited by examiner

WIRELESS CHARGING CONTROL APPARATUS AND METHOD FOR OPTIMAL CHARGING BY ADJUSTING THE INCLINATION OF THE ELECTRIC VEHICLE BEING CHARGED

CROSS-REFERENCE TO RELATED APPLICATION

The present application claims priority to Korean Patent Application No. 10-2016-0100867 filed on Aug. 8, 2016 and Korean Patent Application No. 10-2017-0081346 filed on Jun. 27, 2017, the entire contents of which is incorporated herein for all purposes by this reference.

FIELD OF THE INVENTION

The present invention relates to a wireless charging control method, a wireless charging control apparatus, and a wireless charging apparatus for electric vehicles using the same, and more particularly, to a wireless charging control apparatus and method using alignment between transmission and reception pads, and a wireless charging apparatus using the same.

BACKGROUND

An electric vehicle (EV) charging system may basically be defined as a system for charging a high-voltage battery mounted on an EV by using power of an energy storage device or a power grid of a commercial power source. Such the EV charging system may have various forms according to the type of EV. For example, the EV charging system may be classified into a conductive charging type using a charging cable and a non-contact wireless power transfer (WPT) type (also referred to as an 'inductive charging type').

In the case of inductive charging using a WPT system, when it is necessary to charge the high-voltage battery mounted on the EV, the EV may move to a ground assembly (GA) located in a charging station or a charging spot capable of EV charging.

When charging the EV, a vehicle assembly (VA) (i.e., a reception pad in the VA) mounted on the EV makes an inductive resonance coupling with a transmission pad of the GA located in the charging station or the charging spot, and charges the battery in the EV using power transferred from the GA through the inductive resonance coupling.

On the other hand, the reception pad mounted on the EV should be aligned with the transmission pad installed on the ground to improve or secure the efficiency of wireless power transfer. That is, if the alignment between the reception pad and the transmission pad is not properly performed, the wireless charging efficiency may be lowered. In the conventional wireless charging system, one or both of the pads can be moved only on the horizontal or vertical axis during pad alignment process before the power transmission. In the present reason, when the reception pad in the EV is tilted to one side, although it appears as if it is aligned on a flat surface, the height of the reception pad is not uniform on the side surface, which causes a decrease in the wireless charging efficiency.

As described above, in the wireless power transfer for the EV, since the charging efficiency greatly changes according to an error of the alignment between the transmission pad and the reception pad, precise alignment between the transmission pad and the reception pad is required even when the transmission and reception pads are tilted with respect to each other.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wireless charging control apparatus for aligning transmission and reception pads which are tilted with respect to each other.

Embodiments of the present invention also provide a wireless charging control method for aligning transmission and reception pads which are tilted with respect to each other.

Embodiments of the present invention also provide a wireless charging apparatus for electric vehicles using the wireless changing control apparatus and method.

According to embodiments of the present invention, a wireless charging control apparatus may comprise at least one horizontal detector configured for detecting an inclination of an electric vehicle (EV); a suspension control device controlling a plurality of suspensions disposed near wheels of the EV to adjust a height or the inclination of the EV; and a controller measuring the inclination of the EV based on data collected from the at least one horizontal sensor, estimating an inclination of a reception pad based on the measured inclination of the EV, and controlling the suspension control device to adjust the inclination of the EV when the inclination of the reception pad is equal to or greater than a threshold value.

The controller may control the suspension control device so that the reception pad is in parallel with a transmission pad in a ground assembly (GA) for wireless charging, when the inclination of the reception pad is equal to or greater than the threshold value.

The controller may compare a first unit charge amount measured before the adjustment of the inclination of the reception pad with a second unit charge amount measured after the adjustment of the inclination of the reception pad, and maintain the adjusted inclination of the reception pad when the second unit charge amount exceeds the first device charge amount.

The controller may control the suspension control device to restore the inclination of the EV to a previous inclination before the adjustment of the inclination of the reception pad, when the second unit charge amount is equal to or less than the first device charge amount.

The at least one horizontal detector may be included in an inertia measurement unit (IMU) mounted on the EV.

The at least one horizontal detector may include at least one of a three-axis G-sensor, a pitch sensor, a roll sensor, a yaw sensor, an inclination sensor, and an acceleration sensor.

The suspension control device may control the plurality of suspensions each of which includes at least one of a spring, a pneumatic or hydraulic actuator, a link, and a damper.

Furthermore, in accordance with embodiments of the present invention, an electric vehicle (EV) wireless charging apparatus may comprise a reception pad receiving electric power from a transmission pad in a ground assembly (GA); at least one horizontal detector configured for detecting an inclination of an EV; a suspension control device controlling a plurality of suspensions disposed near wheels of the EV to adjust a height or the inclination of the EV; and a controller measuring the inclination of the EV based on data collected from the at least one horizontal sensor, estimating an inclination of the reception pad based on the measured inclination of the EV, and controlling the suspension control device so that the reception pad is in parallel with the transmission pad when the inclination of the reception pad is equal to or greater than a threshold value.

The controller may compare a first unit charge amount measured before the adjustment of the inclination of the reception pad with a second unit charge amount measured after the adjustment of the inclination of the reception pad, and maintain the adjusted inclination of the reception pad when the second unit charge amount exceeds the first device charge amount.

The controller may control the suspension control device to restore the inclination of the EV to a previous inclination before the adjustment of the inclination of the reception pad, when the second unit charge amount is equal to or less than the first device charge amount.

The at least one horizontal detector may be included in an inertia measurement unit (IMU) mounted on the EV.

The at least one horizontal detector may include at least one of a three-axis G-sensor, a pitch sensor, a roll sensor, a yaw sensor, an inclination sensor, and an acceleration sensor.

The suspension control device may control the plurality of suspensions each of which includes at least one of a spring, a pneumatic or hydraulic actuator, a link, and a damper.

Furthermore, in accordance with embodiments of the present invention, a wireless charging control method may comprise measuring an inclination of an electric vehicle (EV) using data collected through at least one horizontal sensor; estimating an inclination of a reception pad based on the measured inclination of the EV; and controlling at least one suspension of the EV to adjust the inclination of the reception pad when the inclination of the reception pad is equal to or greater than a threshold value.

The controlling at least one suspension of the EV may comprise determining a first device charge amount, the first unit charge amount being an amount of energy charged during a first predetermined device time before the adjustment of the inclination of the reception pad; determining a second device charge amount, the second unit charge amount being an amount of energy charged during a second predetermined device time after the adjustment of the inclination of the reception pad; comparing the first unit charge amount with the second device charge amount; and maintaining the adjusted inclination of the reception pad when the second unit charge amount exceeds the first device charge amount.

The first predetermined device time may be equal to the second predetermined device time.

The controlling at least one suspension of the EV may further comprise controlling the at least one suspension of the EV so that the inclination of the EV is restored to a previous inclination of the EV before the adjustment of the inclination of the reception pad.

The at least one horizontal detector may be included in an inertia measurement device (IMU) mounted on the EV.

The inclination of the EV may be an angle between a bottom surface of the EV and a ground surface.

The at least one horizontal detector may include at least one of a three-axis G-sensor, a pitch sensor, a roll sensor, a yaw sensor, an inclination sensor, and an acceleration sensor.

Using the wireless charging control method according to the embodiments of the present invention as described above is used, the reception pad mounted on the EV can be effectively aligned with the transmission pad on the ground by use of the function of the EV itself (i.e., active suspension control function) even when the transmission and reception pads are tilted with respect to each other.

Further, the wireless charging efficiency can be increased by the precise alignment between the transmission and reception pads, and thus the time required for wireless charging can be shortened.

Further, the wireless charging pads can be effectively aligned without using additional hardware configuration. That is, the wireless charging control method can be performed using an inertial measurement unit (IMU) and a suspension control device which are mounted on the EV.

Further, in a variety of environmental conditions around the transmission pad, the alignment between the transmission and reception pads can be effectively performed through cooperation of an electronic control device, the suspension control device, a controller of the wireless charging system (e.g., the VA controller), and the like.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that although the terms "first," "second," etc. may be used herein to describe various components, these components should not be limited by these terms. These terms are used merely to distinguish one element from another. For example, without departing from the scope of the present invention, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in an exemplary embodiment of the present invention are defined as follows.

"Electric Vehicle, EV": An automobile, as defined in 49 CFR 523.3, intended for highway use, powered by an electric motor that draws current from an on-vehicle energy storage device including a battery, which is rechargeable from an off-vehicle source including residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": A system for a wireless power transfer and control between the GA and VA including alignment and communications. the present system transfers energy from the electric supply network to the electric vehicle electromagnetically through a two-part loosely coupled transformer.

"Wireless power transfer, WPT": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In an exemplary embodiment of the present invention, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. In an exemplary embodiment of the present invention, coupling between the GA Coil and the VA Coil.

"Ground assembly, GA'": An assembly on the infrastructure side including the GA Coil, a power/frequency conversion device and GA controller as well as the wiring from the grid and between each device, filtering circuits, housing(s) etc., necessary to function as the power source of wireless power charging system. The GA may include the communication elements necessary for communication between the GA and the VA.

"Vehicle assembly, VA": An assembly on the vehicle including the VA Coil, rectifier/power conversion device and VA controller as well as the wiring to the vehicle batteries and between each device, filtering circuits, housing(s), etc., necessary to function as the vehicle portion of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be disposed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top portion of the litz wire or the top portion of the magnetic material in the GA Coil to the plane of the lower of the bottom portion of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest portion of the vehicle floor pan.

"Vehicle magnetic ground clearance": A vertical distance between the plane of the lower of the bottom portion of the litz wire or the magnetic material in the VA Coil mounted on a vehicle to the ground surface.

"VA Coil magnetic surface distance": A distance between the plane of the nearest magnetic or conducting component surface to the lower external surface of the VA coil when mounted. the present distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in a case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In an exemplary embodiment of the present invention, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is a name of the network to which you want to connect. It is similar to SSID but can be a more extended concept.

"Basic service set identifier (BSSID)": BSSID including 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is disposed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus including the controller in conjunction with one or more other components, as would be appreciated by a person of ordinary skill in the art.

Hereinafter, embodiments according to an exemplary embodiment of the present invention will be explained in detail by referring to accompanying figures.

Figure 1:
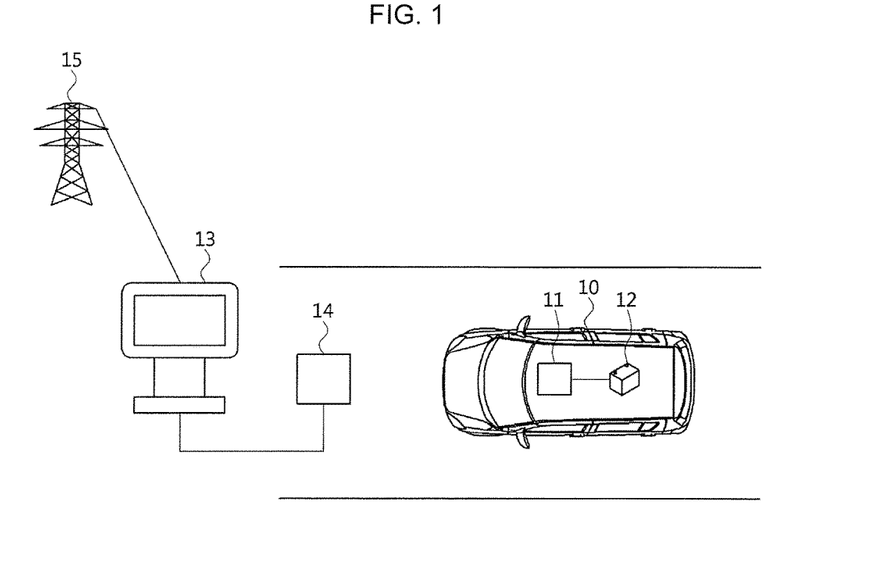
FIG. 1 is a conceptual diagram illustrating a concept of a wireless power transfer (WPT) to which an exemplary embodiment of the present invention is applied.

FIG. 1 is a conceptual diagram illustrating a concept of a wireless power transfer (WPT) to which an exemplary embodiment of the present invention is applied.

Referring to FIG. 1, a wireless power transfer may be performed by at least one component of an electric vehicle (EV) 10 and a charging station 13, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to an exemplary embodiment of the present invention may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery may be referred to as a plug-in electric vehicle (PEV).

Here, the charging station 13 may be connected to a power grid 15 or a power backbone, and may provide an alternating current (AC) power or a direct current (DC) power to a power transmission pad 14 including a transmission coil through a power link.

Also, the charging station 13 may communicate with an infrastructure management system or an infrastructure server that manages the power grid 15 or a power network through wired/wireless communications, and performs wireless communications with the EV 10.

Here, the wireless communications may be Bluetooth, Zigbee, cellular, wireless local area network (WLAN), or the like.

Also, for example, the charging station 13 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 14 of the charging station 13, and making the reception coil and the transmission coil be interacted or coupled with each other. An electromotive force may be induced in the power reception pad 11 as a result of the interaction or coupling, and the battery 12 may be charged by the induced electromotive force.

The charging station 13 and the transmission pad 14 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad 14 or the power reception pad 11 may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
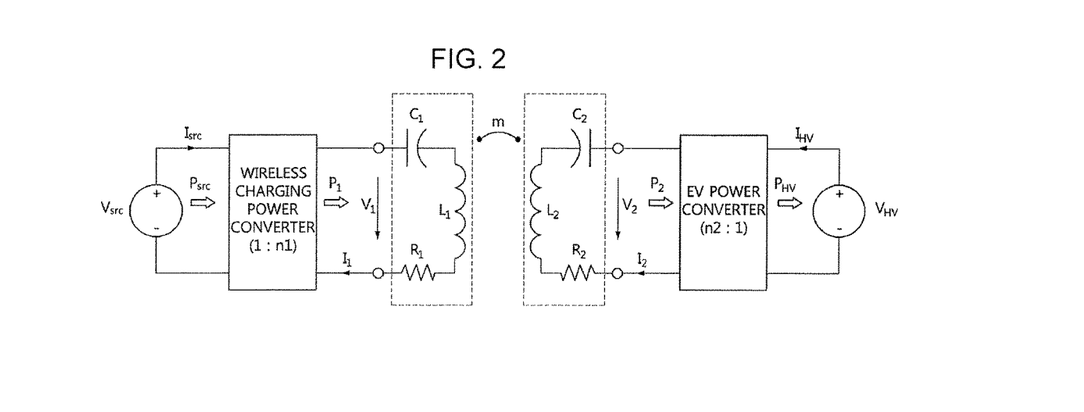
FIG. 2 is a conceptual diagram illustrating a wireless power transfer circuit according to an exemplary embodiment of the present invention.

FIG. 2 is a conceptual diagram illustrating a wireless power transfer circuit according to an exemplary embodiment of the present invention.

Referring to FIG. 2, a schematic configuration of a circuit in which a wireless power transfer is performed in an EV WPT system may be seen.

Here, the left side of FIG. 2 may be interpreted as expressing all or part of a power source Vsrc supplied from the power network, the charging station 13, and the transmission pad 14 in FIG. 1, and the right side of FIG. 2 may be interpreted as expressing all or part of the EV including the reception pad and the battery.

First, the left side circuit of FIG. 2 may provide an output power Psrc corresponding to the power source Vsrc supplied from the power network to a wireless charging power converter. The wireless charging power converter may supply an output power P1 converted from the output power Psrc through frequency-converting and AC-to-DC converting to generate an electromagnetic field at a desired operating frequency in a transmission coil L1.

The wireless charging power converter may include an AC/DC converter for converting the power Psrc which is an AC power supplied from the power network into a DC power, and a low frequency (LF) converter for converting the DC power into a DC power having an operating frequency suitable for wireless charging. For example, the operating frequency for wireless charging may be determined to be within 80 to 90 kHz.

The power P1 output from the wireless charging power converter may be supplied again to a circuit including the transmission coil L1, a first capacitor C1 and a first resistor R1. Here, a capacitance of the first capacitor C1 may be determined as a value to have an operating frequency suitable for charging together with the transmission coil L1. Here, the first resistor R1 may represent a power loss occurred by the transmission coil L1 and the first capacitor C1.

Further, the transmission coil L1 may be made to have electromagnetic coupling, which is defined by a coupling coefficient m, with the reception coil L2 so that a power P2 is transmitted, or the power P2 is induced in the reception coil L2. Therefore, the meaning of power transfer in an exemplary embodiment of the present invention may be used together with the meaning of power induction.

Still further, the power P2 induced in or transferred to the reception coil L2 may be provided to an EV power converter. Here, a capacitance of a second capacitor C2 may be determined as a value to have an operating frequency suitable for wireless charging together with the reception coil L2, and a second resistor R2 may represent a power loss occurred by the reception coil L2 and the second capacitor C2.

The EV power converter may include an LF/DC converter that converts the supplied power P2 of a specific operating frequency to a DC power having a voltage level suitable for the battery VHV of the EV.

The electric power PHV converted from the power P2 supplied to the EV power converter may be output, and the power PHV may be used for charging the battery VHV disposed in the EV.

Here, the right side circuit of FIG. 2 may further include a switch for selectively connecting or disconnecting the reception coil L2 with the battery VHV. Here, resonance frequencies of the transmission coil L1 and the reception coil L2 may be similar or identical to each other, and the reception coil L2 may be positioned near the electromagnetic field generated by the transmission coil L1.

Here, the circuit of FIG. 2 should be understood as an illustrative circuit for wireless power transfer in the EV WPT system used for embodiments of the present invention, and is not limited to the circuit illustrated in FIG. 2.

On the other hand, since the power loss may increase as the transmission coil L1 and the reception coil L2 are located at a long distance, it may be an important factor to properly set the relative positions of the transmission coil L1 and the reception coil L2.

Here, the transmission coil L1 may be included in the transmission pad 14 in FIG. 1, and the reception coil L2 may be included in the reception pad 11 in FIG. 1. Therefore, positioning between the transmission pad and the reception pad or positioning between the EV and the transmission pad will be described below with reference to the drawings.

Figure 3:
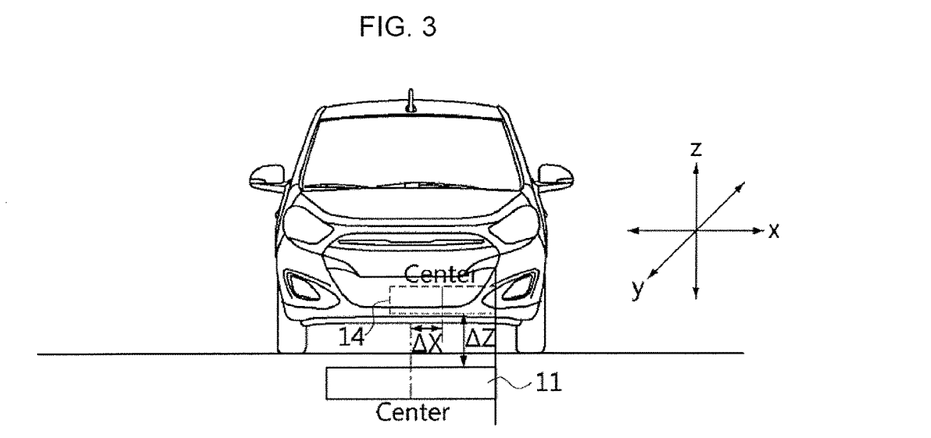
FIG. 3 is a conceptual diagram for explaining a concept of alignment in an EV wireless power transfer according to an exemplary embodiment of the present invention.

FIG. 3 is a conceptual diagram for explaining a concept of alignment in an EV wireless power transfer according to an exemplary embodiment of the present invention.

Referring to FIG. 3, a method of aligning the power transmission pad 14 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 14 is illustrated as positioned below a ground surface as shown in FIG. 3, the transmission pad 14 may also be positioned on the ground surface, or positioned such that a top portion surface of the transmission pad 14 is exposed below the ground surface.

The reception pad 11 of the EV may be defined by different categories according to its heights (defined in the z direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

Here, the height of the reception pad measured from the ground surface may correspond to the previously defined term 'vehicle magnetic ground clearance'.

Further, the position of the power transmission pad 14 in the height direction (i.e., defined in the z direction) may be determined to be located between the maximum class and the minimum class supported by the power reception pad 11. For example, when the reception pad supports only the class 1 and 2, the position of the power transmission pad 14 may be determined between 100 and 210 mm with respect to the power reception pad 11.

Still further, a gap between the center of the power transmission pad 14 and the center of the power reception pad 11 may be determined to be located within the limits of the horizontal and vertical directions (defined in the x and y directions). For example, it may be determined to be located within ±75 mm in the horizontal direction (defined in the x direction), and within ±100 mm in the vertical direction (defined in the y direction).

Here, the relative positions of the power transmission pad 14 and the power reception pad 11 may be varied in accordance with their experimental results, and the numerical values may be understood as exemplary.

Figure 4:
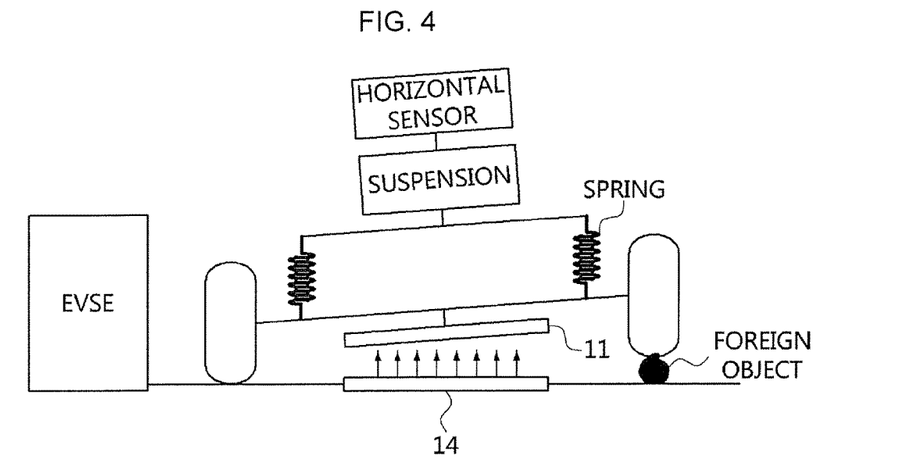
FIG. 4 is a conceptual diagram for explaining a problem of pad alignment in a conventional wireless charging system.

FIG. 4 is a conceptual diagram for explaining a problem of pad alignment in a conventional wireless charging system.

As illustrated in FIG. 4, an EV may be placed in a form in which a power reception pad 11 of the EV is placed on a transmission pad 14 in a base connected to an EVSE for wireless charging.

When the EV aligns the reception pad 11 and the transmission pad 14 placed on a ground surface and starts charging its battery wirelessly, or during wireless charging, when there is a foreign object on the ground surface or the ground surface itself is uneven, the reception pad 11 of the EV may be tilted to one side. At this time, although alignment between the transmission and reception pads appears to be well-performed on a plane parallel to the ground surface, the relative height of the reception pad to the transmission pad may not be uniform as illustrated in FIG. 4. That is, the distance between the reception pad and the transmission pad may not be uniform with respect to the entire pad area. This non-uniformity may increase misalignment between the reception pad and the transmission pad, and the wireless power transfer efficiency may be greatly reduced.

As described above with reference to FIG. 3, assuming that the reception pad is present on a plane parallel to the ground surface, the alignment of the transmission pad 14 and the reception pad 11 in a conventional wireless charging system is considered only in the transverse and longitudinal directions (defined as x-direction and y-direction) on a plane parallel to the ground surface.

Therefore, there is a need for a pad alignment method that takes into account the case where the reception pad is tilted with respect to the transmission pad as in the case shown in FIG. 4.

Figure 5:
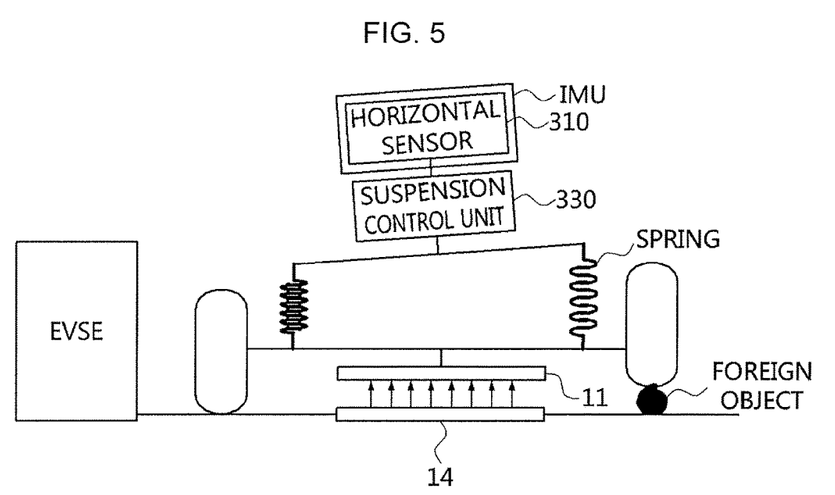
FIG. 5 is a conceptual diagram for explaining a wireless charging pad alignment method according to an exemplary embodiment of the present invention.

FIG. 5 is a conceptual diagram for explaining a wireless charging pad alignment method according to an exemplary embodiment of the present invention.

As illustrated in FIG. 5, a wireless charging pad alignment method according to an exemplary embodiment of the present invention may be performed using at least one horizontal detector 310 and a suspension control device 330.

That is, in an exemplary embodiment of the present invention, the inclination of the reception pad 11 may be estimated by identifying the overall inclination of the EV by use of the at least one horizontal detector 310 mounted on the EV. Also, the suspension control device 330 according to an exemplary embodiment of the present invention may control each of suspensions (e.g., four suspensions) disposed near the wheels of the EV to adjust the height or inclination of the EV so that the transmission pad and the reception pad are parallel to each other.

Here, the inclination of the EV may mean an angle between the ground surface and the bottom surface of the EV, and the bottom surface of the EV may be defined from a plurality of data measured from the at least one horizontal detector 310. In addition, the inclination of the reception pad may be an angle between the reception pad and the ground surface. The inclination of the reception pad is not measured but is a value estimated from the inclination of the EV in that the inclination of the reception pad may be the same as the inclination of the EV.

According to an exemplary embodiment of the present invention, the at least one horizontal detector 310 may be used as included in the EV (e.g., in an Inertia Measurement Unit (IMU) mounted on the EV), and the inclination of the EV may be identified by utilizing the at least one horizontal sensor.

Here, the IMU is a detecting device for measuring an inertial force by use of an accelerometer, a gyroscope, and a magnetometer. The at least one horizontal detector 310 may include a three-axis G-sensor, a pitch sensor, a roll sensor, a yaw sensor, a tilt sensor, an acceleration sensor, or a combination thereof.

According to an exemplary embodiment of the present invention, the reception pad for wireless charging may be adjusted without an additional hardware by use of the at least one horizontal detector 310 included in the IMU and the suspension control device 330. Thus, a time required for the wireless charging may be shortened by increasing the wireless charging efficiency.

Meanwhile, the suspension control device 330 may be included in an active suspension or a device for controlling the active suspension. The active suspension may include pneumatic or hydraulic actuators, various links, dampers, etc. as well as a spring shown in FIG. 4.

According to an exemplary embodiment of the present invention, as illustrated in FIG. 4, even when an EV having three, four or more wheels is placed on an unlevel ground, the inclination of the reception pad can be effectively adjusted through cooperation between a wireless charge control apparatus (e.g., the VA controller) of the EV and the suspension control device, and thus the precise alignment of the transmission and reception pads can be performed effectively.

Figure 6:
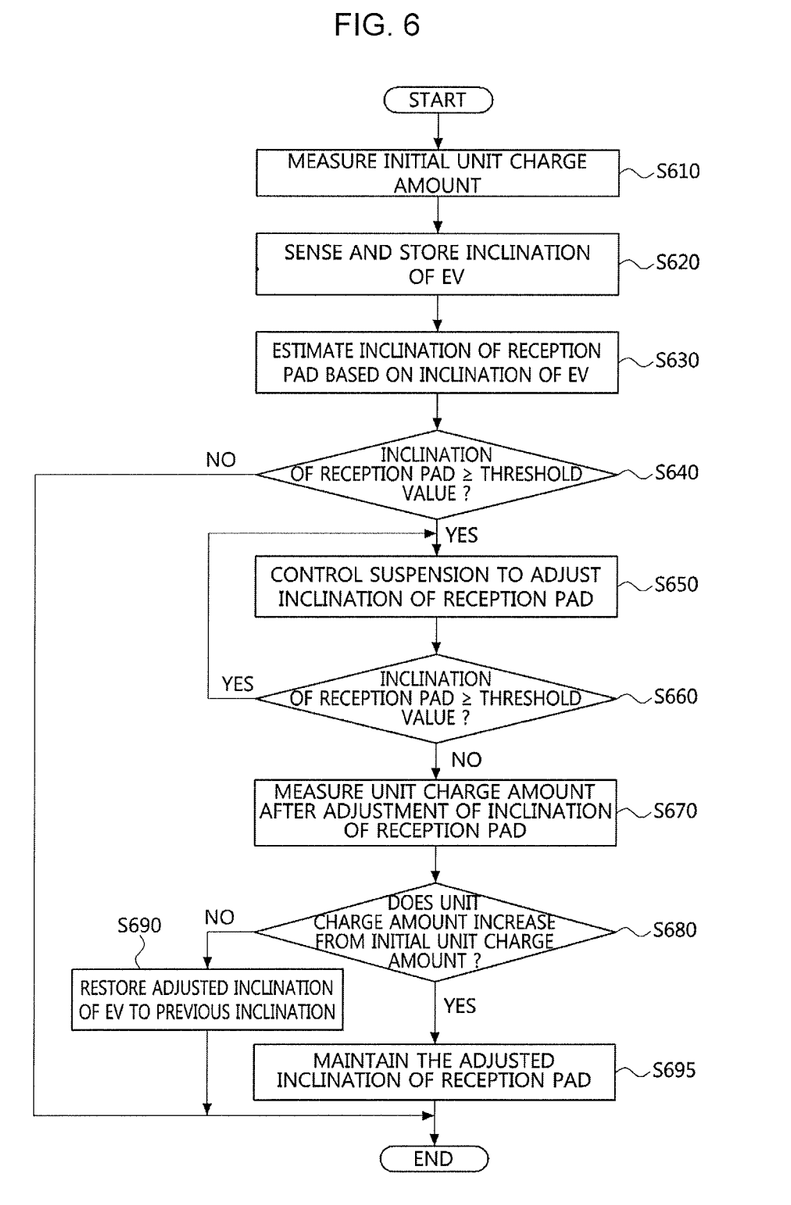
FIG. 6 is a flow chart for explaining a wireless charging pad alignment method according to an exemplary embodiment of the present invention.

FIG. 6 is a flow chart for explaining a wireless charging pad alignment method according to an exemplary embodiment of the present invention.

The method illustrated in FIG. 6 may be performed by a wireless charging control apparatus according to an exemplary embodiment of the present invention. However, the entity performing the wireless charging pad alignment method according to an exemplary embodiment of the present invention is not limited to the wireless charging control apparatus.

The wireless charging pad alignment method illustrated in FIG. 6 may be a part of a wireless charging control method according to an exemplary embodiment of the present invention.

A wireless charging control method according to an exemplary embodiment of the present invention may comprise determining an inclination of an EV using data collected from a plurality of horizontal sensors, estimating an inclination of a reception pad of the EV based on the determined inclination of the EV, and controlling at least one suspension of the EV to adjust the inclination of the EV when the inclination of the reception pad is equal to or greater than a threshold value.

Referring to FIG. 6, the wireless charge control apparatus may first measure an initial unit charge amount (S610). Here, the initial unit charge amount may be a reference value to be compared with a device charge amount measured after aligning the wireless charging pads according to an exemplary embodiment of the present invention, and may be determined by measuring the amount of energy charged within a predetermined unit time.

As such, the inclination of the EV may be detected through the at least one horizontal sensor, and stored (S620). When the inclination of the EV is sensed, the inclination of the reception pad according to the inclination of the EV may be estimated (S630).

When the estimated inclination of the reception pad is derived, the estimated inclination of the reception pad may be compared with a threshold value (S640), and it may be determined whether the inclination adjustment of the EV is necessary or not.

When it is determined that the inclination of the reception pad is greater than the threshold value, the inclination of the reception pad may be adjusted by driving at least one suspension through the suspension control device (S650). On the other hand, when it is determined that the inclination of the reception pad is less than the threshold value, the pad alignment operation may be terminated.

After driving at least one suspension in the step S650, the adjusted inclination of the reception pad may be estimated again, and the adjusted inclination of the reception pad may be compared with the threshold value (S660). When the adjusted inclination is greater than the threshold value, it may be determined that the pad is not yet properly aligned, and at least one suspension may be further controlled to readjust the inclination of the reception pad (S650).

When the adjusted inclination is less than the threshold value, it may be determined that the pad is properly aligned, and the wireless charging may be resumed to measure the unit charge amount after aligning the wireless charging pads (S670). In the instant case, the unit charge amount measured after aligning the wireless charging pads is the amount of energy charged within a predetermined unit time which is the same as the predetermined unit time used for measuring the initial unit charge amount.

The unit charge amount after aligning the wireless charging pads may be compared with the initial unit charge amount (S680). When the unit charge amount after aligning the wireless charging pads does not increase with respect to the initial unit charge amount, the inclination of the EV may be restored to the stored previous inclination of the EV (S690). In other words, the decrease in the unit charge amount after aligning relative to the initial unit charge amount may mean that the alignment between the transmission pad and the reception pad became worse. Therefore, the inclination of the EV may be controlled according to the value stored in the step S620 before performing alignment through the suspension control device. After restoring to the previous inclination, the pad alignment operation may be terminated or the pad alignment operation may be re-executed by returning to the initial step S610.

On the other hand, when the unit charge amount after aligning the wireless charging pads increases as compared with the initial unit charge amount, it may be determined that the pad alignment has been normally performed and the pad alignment operation may be terminated.

In summary, in an exemplary embodiment of the present invention illustrated in FIG. 6, the initial unit charge amount is stored at the time of starting wireless charging, and the inclination of the reception is estimated by measuring the inclination of the EV through the horizontal sensor. When the reception pad is inclined above a threshold value, at least one suspension of the EV is driven to adjust the inclination of the reception pad. When the inclination of the reception pad is less than the threshold value, a current unit charge amount is compared with the initial unit charge amount, and the pad alignment control is terminated when the current unit charging amount is increased as compared to the initial unit charge amount.

Figure 7:
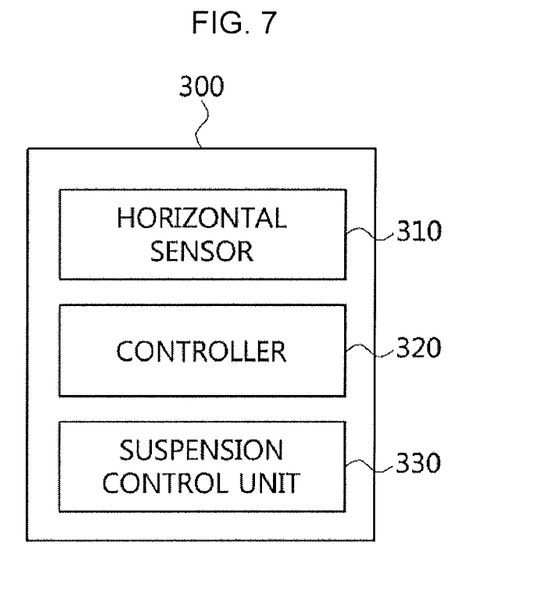
FIG. 7 is a block diagram illustrating a wireless charging control apparatus according to an exemplary embodiment of the present invention.

FIG. 7 is a block diagram illustrating a wireless charging control apparatus according to an exemplary embodiment of the present invention.

As illustrated in FIG. 7, a wireless charging control apparatus according to an exemplary embodiment of the present invention may comprise at least one horizontal detector 310, a controller 320, and a suspension control device 330.

The at least one horizontal detector 310 may detect the inclination of the EV, and a plurality of horizontal sensors may be located in a plurality of positions in the EV.

The suspension control device 330 may control a plurality of suspensions disposed near the wheels of the EV to adjust the height or inclination of the EV.

The controller 320 may measure the inclination of the EV using the data collected from at least one horizontal detector 310 and estimate the inclination of the reception pad based on the measured inclination of the EV. When the inclination of the reception pad is equal to or greater than the threshold value, the controller 320 may control the suspension control device 330 to adjust the inclination of the EV.

Here, when the inclination of the reception pad is equal to or greater than the threshold, the controller 320 may control the suspension control device 330 such that the reception pad is in parallel with the transmission pad in the GA for wireless charging. Also, the controller 320 may compare a first unit charge amount measured before the adjustment of the inclination of the reception pad with a second unit charge amount measured after the adjustment the inclination of the reception pad. When the second unit charge amount exceeds the first unit charge amount, the controller may maintain the adjusted inclination of the reception pad in S695 of FIG. 7.

Although not shown, a wireless charging apparatus for an EV according to an exemplary embodiment of the present invention may be configured to comprise the reception pad 11 for receiving electric power from the transmission pad in cooperation with the transmission pad in the GA, the at least one horizontal detector 310, the suspension control device 330 for controlling a plurality of suspensions disposed near the wheels of the EV to adjust the height or inclination of the EV, and the controller 320 measuring the inclination of the EV based on data collected from the at least one horizontal detector 310, estimating the inclination of the reception pad 11 based on the measure inclination of the EV, and controlling the suspension control device 330 so that the reception pad is in parallel with the transmission pad when the inclination of the reception pad is equal to or greater than a predetermined threshold value.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present invention or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present invention, and vice versa.

While some aspects of the present invention have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wireless charging control apparatus comprising:
   at least one horizontal detector configured for detecting an inclination of an electric vehicle (EV);
   a suspension controller configured for controlling a plurality of suspensions mounted in the EV and disposed adjacent to wheels of the EV to adjust a height or the inclination of the EV; and
   a controller measuring the inclination of the EV based on data collected from the at least one horizontal sensor, estimating an inclination of a reception pad based on the measured inclination of the EV, and controlling the suspension controller to adjust the inclination of the EV when the inclination of the reception pad is equal to or greater than a threshold value,
   wherein the controller is configured to compare a first unit charge amount measured before an adjustment of the inclination of the reception pad with a second unit charge amount measured after the adjustment of the inclination of the reception pad, and is configured to maintain an adjusted inclination of the reception pad when the second unit charge amount exceeds the first unit charge amount, and is configured to control the suspension controller to restore the inclination of the EV to a previous inclination before the adjustment of the inclination of the reception pad, when the second unit charge amount is equal to or less than the first unit charge amount.

2. The wireless charging control apparatus according to claim 1, wherein the controller is configured to control the suspension controller such that the reception pad is in parallel with a transmission pad in a ground assembly (GA) for wireless charging, when the inclination of the reception pad is equal to or greater than the threshold value.

3. The wireless charging control apparatus according to claim 1, wherein the at least one horizontal detector is disposed in an inertia measurement unit (IMU) mounted on the EV.

4. The wireless charging control apparatus according to claim 1, wherein the at least one horizontal detector includes at least one of a three-axis G-sensor, a pitch sensor, a roll sensor, a yaw sensor, an inclination sensor, and an acceleration sensor.

5. The wireless charging control apparatus according to claim 1, wherein the suspension controller is configured to control the plurality of suspensions, each of which includes at least one of a spring, a pneumatic or hydraulic actuator, a link, and a damper.

6. An electric vehicle (EV) wireless charging apparatus comprising:
   a reception pad receiving electric power from a transmission pad in a ground assembly (GA);
   at least one horizontal detector configured for detecting an inclination of an EV;
   a suspension controller configured for controlling a plurality of suspensions mounted in the EV and disposed adjacent to wheels of the EV to adjust a height or the inclination of the EV; and
   a controller measuring the inclination of the EV based on data collected from the at least one horizontal sensor, estimating an inclination of the reception pad based on the measured inclination of the EV, and controlling the suspension controller so that the reception pad is in parallel with the transmission pad when the inclination of the reception pad is equal to or greater than a threshold value,
   wherein the controller is configured to compare a first unit charge amount measured before an adjustment of the inclination of the reception pad with a second unit charge amount measured after the adjustment of the inclination of the reception pad, and is configured to maintain an adjusted inclination of the reception pad when the second unit charge amount exceeds the first unit charge amount and is configured to control the suspension controller to restore the inclination of the EV to a previous inclination before the adjustment of the inclination of the reception pad, when the second unit charge amount is equal to or less than the first unit charge amount.

7. The EV wireless charging apparatus according to claim 6, wherein the at least one horizontal detector is included in an inertia measurement unit (IMU) mounted on the EV.

8. The EV wireless charging apparatus according to claim 6, wherein the at least one horizontal detector includes at least one of a three-axis G-sensor, a pitch sensor, a roll sensor, a yaw sensor, an inclination sensor, and an acceleration sensor.

9. The EV wireless charging apparatus according to claim 6, wherein the suspension controller is configured to control the plurality of suspensions, each of which includes at least one of a spring, a pneumatic or hydraulic actuator, a link, and a damper.

10. A wireless charging control method comprising:
   measuring, by a controller, an inclination of an electric vehicle (EV) using data collected through at least one horizontal sensor;
   estimating, by the controller, an inclination of a reception pad based on the measured inclination of the EV; and
   controlling, by the controller, at least one suspension mounted in the EV and disposed adjacent to wheels of the EV to adjust the inclination of the reception pad when the inclination of the reception pad is equal to or greater than a threshold value,
   wherein the controlling at least one suspension of the EV includes:
   determining a first unit charge amount, the first unit charge amount being an amount of energy charged during a first predetermined unit time before an adjustment of the inclination of the reception pad;
   determining a second unit charge amount, the second unit charge amount being an amount of energy charged during second redetermined unit time after the adjustment of the inclination of the reception pad;
   comparing the first unit charge amount with the second unit charge amount; and
   maintaining an adjusted inclination of the reception pad when the second unit charge amount exceeds the first unit charge amount and controlling the at least one suspension of the EV such that the inclination of the EV is restored to a previous inclination of the EV before the adjustment of the inclination of the reception pad.

11. The wireless charging control method according to claim 10, wherein the first predetermined unit time is equal to the second predetermined unit time.

12. The wireless charging control method according to claim 10, wherein the at least one horizontal detector is included in an inertia measurement unit (IMU) mounted on the EV.

13. The wireless charging control method according to claim 10, wherein the inclination of the EV is an angle between a bottom surface of the EV and a ground surface.

14. The wireless charging control method according to claim 10, wherein the at least one horizontal detector includes at least one of a three-axis G-sensor, a pitch sensor, a roll sensor, a yaw sensor, an inclination sensor, and an acceleration sensor.

* * * * *